(12) United States Patent
Shimizu

(10) Patent No.: US 7,184,060 B2
(45) Date of Patent: Feb. 27, 2007

(54) SPECIAL EFFECT DEVICE, ADDRESS SIGNAL GENERATING DEVICE, ADDRESS SIGNAL GENERATING METHOD AND ADDRESS SIGNAL GENERATING PROGRAM

(75) Inventor: Hideyuki Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 280 days.

(21) Appl. No.: 10/816,038

(22) Filed: Apr. 1, 2004

(65) Prior Publication Data
US 2004/0257474 A1   Dec. 23, 2004

(30) Foreign Application Priority Data
Apr. 4, 2003   (JP) ............................. 2003-102351

(51) Int. Cl.
*G09G 5/00*   (2006.01)
(52) U.S. Cl. ...................... 345/619; 345/582; 345/585; 345/586; 348/587; 348/594
(58) Field of Classification Search ..................... None
See application file for complete search history.

(56) References Cited

U.S. PATENT DOCUMENTS 4,860,217 A * 8/1989 Sasaki et al. ............... 345/653

6,091,423 A * 7/2000 Shiraishi et al. ............ 345/619

OTHER PUBLICATIONS http://www.dreamstime.com/bazooka-holeinasteelwall-image458612.*
http://www.amazon.com/gp/product/B0002NIIQ8/qid=1141404658/sr=1-13/ref=sr_1_13/002-8108102-7496006?%5Fencoding=UTF8&v=glance&n=15684181.*
http://photos.travisswicegood.com/v/Objects-and-Toys/StopSignBulletHole.jpg.html.*

* cited by examiner

Primary Examiner—Mark Zimmerman
Assistant Examiner—Jwalant Amin
(74) Attorney, Agent, or Firm—Frommer Lawrence & Haug LLP; William S. Frommer; Thomas F. Presson

(57) ABSTRACT

A special effect device by which an entirely new special picture effect is to be implemented in accordance with a read address control system. The device includes an address signal generating unit 3 which generates a readout address signal for picture signals stored in a frame buffer 2 so that, by rupturing a picture portion of an area at an optional position of a picture in the frame buffer, defined by a circle having a radius of an optional size, with the center of the circle as a rupturing point, a folded picture portion will be obtained which has the circumference of the circle as a topological boundary.

5 Claims, 5 Drawing Sheets

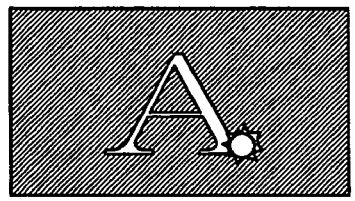

FIG.3

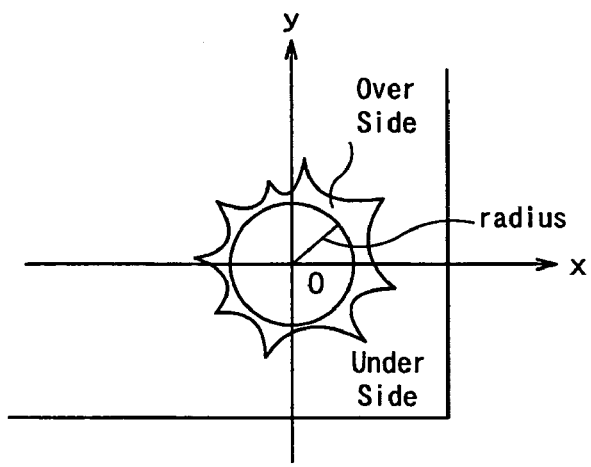

FIG.4

| PARAMETER NAME | MEANING | RANGE | DEFAULT |
|---|---|---|---|
| fixRadius | RADIUS | 0.0to1.0 | 0.2 |
| lPlickle | NUMBER OF BARBS | 4to64 | 16 |
| fixAmpMax | AMPLITUDE OF THE PROTUBERANT SIDE | -1.0to1.0 | 0.0 |
| fixAmpMin | AMPLITUDE OF THE RECESSED SIDE | -1.0to1.0 | 0.1 |
| fixRandom | RANDOM NUMBER | 0.0to1.0 | 0.0 |
| fixScale | CONTRACTION RATIO | 0.0to1.0 | 0.0 |
| fixMatteRation | TRANSMITTANCE | 0.0to1.0 | 0.0 |
| vMatteColor[4] | BACK SIDE COLOR | R/G/B0to255 | all128 |
| fixCenterX | CENTER | -1.0to1.0 | 0.0 |
| fixCenterY | CENTER | -1.0to1.0 | 0.0 |
| fixRotate | AMOUNT OF ROTATION | -720.0to720.0 | 0.0 |

FIG.5

SPECIAL EFFECT DEVICE, ADDRESS SIGNAL GENERATING DEVICE, ADDRESS SIGNAL GENERATING METHOD AND ADDRESS SIGNAL GENERATING PROGRAM

BACKGROUND OF THE INVENTION

1. Field of the invention

This invention relates to a special picture effect and, more particularly, to a special effect device for executing the special picture effect using a read address control system. This invention also relates to an address signal generating device, an address signal generating method and an address signal generating program.

This application claims priority of Japanese Patent Application No.2003-102351, filed in Japan on Apr. 4, 2003, the entirety of which is incorporated by reference herein.

2. Description of Related Art

A read address control system, in which a special picture effect is applied to picture signals stored in a frame memory by converting the readout address (address at the time of readout) and reading out the resulting address to apply a special picture effect to the picture signals, has been devised and put to practical use (see for example the Japanese Laying-Open Patent Publication H10-145672).

This read address control system has been devised and put to practical use only with respect to an extremely simple special picture effect, such as enlargement, contraction, rotation or displacement of pictures.

SUMMARY OF THE INVENTION

It is therefore an object of the present invention to provide a special effect device, an address signal generating device, an address signal generating method and an address signal generating program, which execute an entirely new special picture effect with the use of the aforementioned read address system.

In one aspect, the present invention provides a special effect device -in which picture signals are read out from a frame buffer based on an address signal to impart a desired special effect to a picture corresponding to the picture signals read out from the frame buffer. The special effect device comprises address signal generating means for generating a readout address signal for the picture signals stored in the frame buffer so that, by rupturing a picture portion within an area at an optional position of the picture, defined by a circle having a radius of an optional size, with the center of the circle as a rupturing point, a folded figure will be obtained which has the circumference of the circle as a topological boundary.

In another aspect, the present invention provides an address signal generating device for generating an address signal for reading out picture signals corresponding to a picture from a frame buffer, in which the address signal generating device comprises address signal generating means for generating a readout address signal for the picture signals stored in the frame buffer so that, by rupturing a picture portion within an area at an optional position of the picture, defined by a circle having a radius of an optional size, with the center of the circle as a rupturing point, a folded figure will be obtained which has the circumference of the circle as a topological boundary.

In still another aspect, the present invention provides an address signal generating method for generating an address signal for reading out picture signals corresponding to a picture from a frame buffer, in which the address signal generating method comprises an address signal generating step of generating a readout address signal for the picture signals stored in the frame buffer so that, by rupturing a picture portion of an area at an optional position of the picture defined by a circle having a radius of an optional size, with the center of the circle as a rupturing point, a folded picture will be obtained which has the circumference of the circle as a topological boundary.

In yet another aspect, the present invention provides an address signal generating program for having a computer execute an address signal generating process for reading out picture signals corresponding to a picture from a frame buffer, in which the address signal generating process includes generating a readout address signal for the picture signals stored in the frame buffer so that, by rupturing a picture portion of an area at an optional position of the picture defined by a circle having a radius of an optional size, with the center of the circle as a rupturing point, a folded picture portion will be obtained which has the circumference of the circle as a topological boundary.

According to the present invention, as described above, the address signal generating unit generates a readout address signal for picture signals stored in a frame buffer so that, by rupturing a picture portion of an area at an optional position of a picture in the frame buffer, defined by a circle having a radius of an optional size, with the center of the circle as a rupturing point, a folded picture portion will be obtained which has the circumference of the circle as a topological boundary, thereby achieving a totally new special picture effect.

BRIEF DESCRIPTION OF THE DRAWINGS

FIG. 3 shows an example of a picture obtained on applying an effect by the special picture effect device.

FIG. 4 illustrates a bullet mark effect.

FIG. 5 shows parameters supplied to the read address generator in carrying out the bullet mark effect.

DESCRIPTION OF PREFERRED EMBODIMENTS

Figure 1:
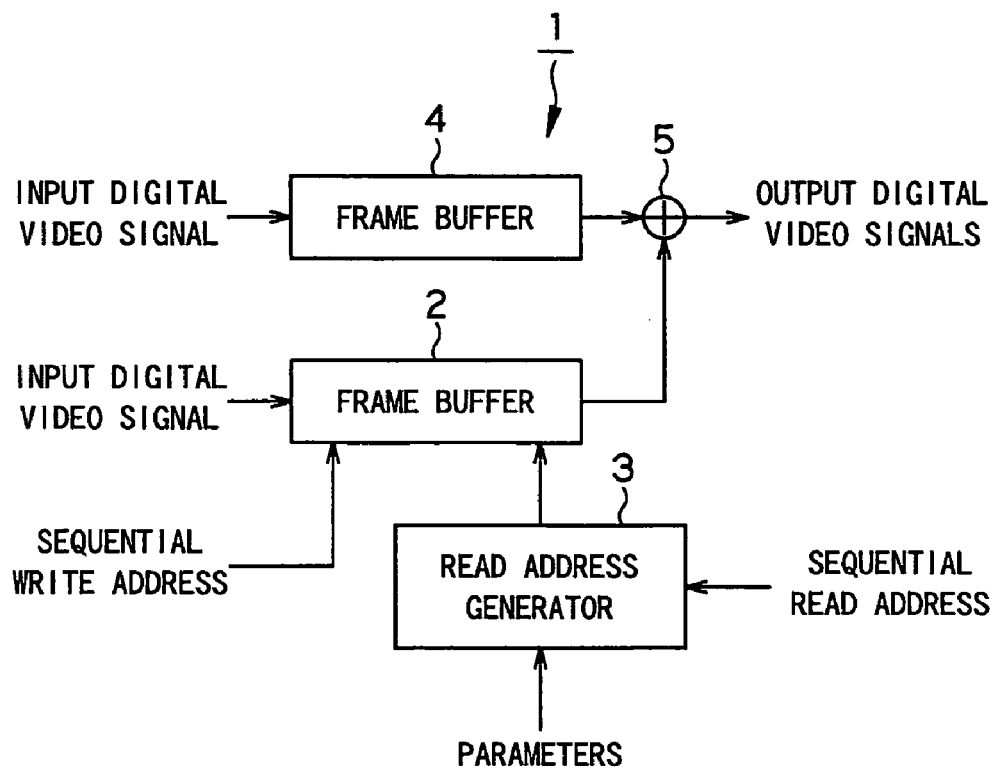
FIG. 1 illustrates the structure of a special picture effect device embodying the present invention.

Referring to the drawings, a special effect device, an address signal generating device, an address signal generating method and an address signal generating program are now explained in detail.

Referring first to FIG. 1, the structure of a special picture effect device, embodying the present invention, is explained. The special picture effect device 1 is a device supplied with digitized video signals to issue an output so that a preset special picture effect will be obtained. The special picture effect device 1 employs a read address control system as a system for applying the special picture effect to the input digital video signals. The read address control system is able to change the address which is valid in reading out pixel data making up a picture frame to achieve a variegated special picture effect. In the following description, the special picture effect is referred to simply as a special effect.

The special picture effect device 1, shown in FIG. 1, includes a frame buffer 2, a read address generator 3, a frame buffer 4 and a picture synthesizing unit 5.

The frame buffer 2 is a buffer memory for transient storage of the input digital video signals on the frame basis. The frame buffer 2 is able to store a plural number of frames, depending on the memory capacity. The digital video signals, supplied to the frame buffer 2, are given sequential write addresses (X, Y) indicating the positions on a frame as the two-dimensional space so as to be then stored in the frame buffer 2. That is, the digital video signals, supplied to the frame buffer 2, are stored as picture data in addresses (X, Y) in the memory space in the frame buffer 2.

Meanwhile, the write addresses (X, Y) are the same as the addresses (X, Y). That is, the write addresses (X, Y) are the addresses used in writing the digital video signals in the frame buffer 2 and become the addresses (X, Y) after having been written in the frame buffer 2. In the following description, it is assumed that frame-based picture data have already been stored in the frame buffer 2, and that the addresses in which are stored the picture data are the addresses (X, Y).

It is also assumed that the picture data stored in the frame buffer 2 has undergone the cropping processing of extracting picture data of an area which becomes valid in executing the special effect as later explained.

The read address generator 3 calculates the read addresses in reading out the picture data stored in the frame buffer 2, depending on the type of the special effect, in accordance with the read address control system employed in the special picture effect device 1. Using the so calculated read addresses, the read address generator 3 reads out the picture data stored in the frame buffer 2 to permit outputting of the picture to which the special effect has been applied.

Specifically, the read address generator 3 converts the sequential read addresses (x, y), used in reading out the picture data from the frame buffer 2, into the addresses (X, Y) of the picture data stored in the frame buffer 2, by calculations employing the parameters which differ with the type of the special effect. The read address generator 3 specifies the picture data, stored in the frame buffer 2, with the addresses (X, Y) converted from the sequential read addresses (x, y), to permit the picture data to be sequentially output in order to output the picture processed with the special effect.

Figure 2:
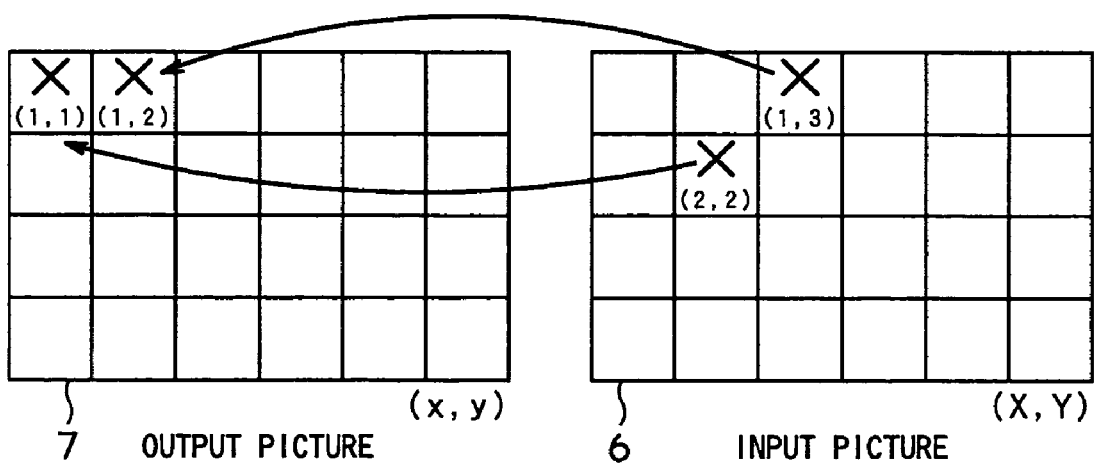
FIG. 2 shows a specified example for illustrating a read address control system as used in the special picture effect device.

For example, consider a picture frame 6 and a picture frame 7 shown in FIG. 2. The picture frame 6 is picture data stored in the frame buffer 2. The picture frame 7 is picture data read out from the frame buffer 2 such as to produce a special effect. That is, the picture frame 6 stored in the frame buffer 2 is read out with the address (X, Y) designated by the read address generator 3 to output the picture frame 7 to which the special effect has been applied.

In case the picture frame 6 and the picture frame 7 are each made up by picture data of (4×6) matrix, the picture frame 7 has the read addresses (x, y) sequentially designated in the horizontal scanning direction in a sequence of (1, 1) component, (1, 2) component and so forth. Responsive to this designation of the read addresses (x, y), the read address generator 3 determines the addresses (X, Y) of the picture frame 6 stored in the frame buffer 2, using the parameters which differ with the type of the special effect, in order to read out the picture data.

In FIG. 2, if, in order to form the picture frame 7, processed with the special effect, the read address (1, 1) is specified by the read address generator 3, the picture data stored in the address (2, 2) of the picture frame stored in the frame buffer 2 is read out. If the read address (1, 2) is specified, the picture data stored in the address (1, 3) of the picture frame is read out.

In this manner, the picture frame 6 stored in the frame buffer 2 is output as the picture frame 7, to which the special effect has been applied.

Thus, the special picture effect device 1, described above, is able to read out the picture data, stored in the frame buffer 2, with the address (X, Y) designated by the read address generator 3, to permit the outputting of a picture to which the special effect has been applied.

The detailed operation to be performed in the read address generator 3 will be explained later when the special effect is subsequently explained.

The special picture effect device 1 also includes the frame buffer 4 and the picture synthesizing unit 5. Similarly to the frame buffer 2, the frame buffer 4 is a buffer for transiently storing picture data on the frame basis. The picture data, stored in the frame buffer 4, is output as a picture not processed with the special effect, and is synthesized to an output picture from the frame buffer 2 by the picture synthesizing unit 5.

By providing the frame buffer 4 and the picture synthesizing unit 5, such outputting is possible in which, in case the output picture from the frame buffer 2, processed with the special effect, should disappear from the picture surface, an output picture from the frame buffer 4 appears on the background. An efficacious technique may be realized in case it is desirable to emphasize a scene change by the special effect.

The special effect realized by the special picture effect device 1 is now explained in detail.

The special effect, that may be realized with the special picture effect device 1, is the bullet mark effect. This special effect is now explained.

The bullet mark effect is a special effect of generating a picture in which has been bored a hole, such as one produced by a bullet passing completely through an optional point of the picture, as shown in FIG. 3. When a bullet has completely passed through an object, the general impression is that a hole of substantially the same diameter as the bullet diameter is formed, and the point hit by the bullet gets a jagged hangnail by being broken with the center of the hole as a rupturing point. This impression is envisioned in the bullet mark effect realized by the present invention.

FIG. 4 shows a picture to which the bullet mark effect has been carried out on the rectangular coordinate system. When the bullet mark effect has been carried out, a jagged curled-up picture portion is formed to express the penetration by the bullet. The curled-up picture portion is termed an Over Side and the non-curled-up picture portion is termed an Under Side. The picture portion penetrated by the bullet is of a circular shape of a radius (fixRadius×picture height H), with the center of the circle being the rupture point. For carrying out the bullet mark effect, the polar coordinate system is used, as will be explained subsequently.

Referring to FIG. 5, the parameters supplied to the read address generator 3 for use in producing the bullet mark effect are now explained. The parameter fixRadius determines the ratio of the radius of the hole (circle) passed through by the bullet. The maximum value of the radius of the circle, that is, the radius for fixRadius=1, is the picture height H. The parameter IPlickle is used for determining the number of barbs of the jagged shape forming the Over Side area. The parameter fixAmpMax is used for setting the amplitude of the protuberant side of the barb in terms of a ratio thereof to the radius of the circle. That is, if fixAmpMax=1, the amplitude of the protuberant side is equal to the radius of the circle. The parameter fixAmpMin is used for setting the amplitude of the concave side of the barb in terms of a ratio thereof to the radius of the circle. That is, if fixAmpMin=1, the amplitude of the concave side is equal to the radius of the circle. The parameter fixRandom is used for generating a random number used for generating the function F(,,) as later explained. The parameter fixScale is used for determining the contraction ratio. With the contraction ratio equal to 0 or 1, it is the picture of the center of the circle passed through by the bullet or the picture of the circumference of the circle that is represented on the protuberant side, respectively. The parameter vMatteRatio is used for setting how much light is transmitted through the Over Side picture and the parameter vMatteColor is used for setting the color of the back side of the Over Side picture.

The parameters fixCenterX and fixCenterY are used for setting the center about which the special effect is to be implemented. The parameter fixRotate is used for setting the amount of rotation of the coordinate axes. If the coordinate axes are rotated, the position of the protuberances and recesses of the jagged shape is rotated.

The protuberances and recesses of the jagged shape, formed by penetration by a bullet, in the bullet mark effect, are hereinafter explained. These protuberances and recesses are determined by the function F(,,) indicated by the equation (1-1):

$$F(\theta) = F'(t) = \begin{cases} 4(y_p - y_q)(t - 0.5)^2 + y_q & (0.0 \le t < 0.5) \\ 4(y_r - y_q)(t - 0.5)^2 + y_q & (0.5 \le t < 1.0) \end{cases} \quad (1\text{-}1)$$

where t=θ×1Plickle (mod 2π).

Figure 6:
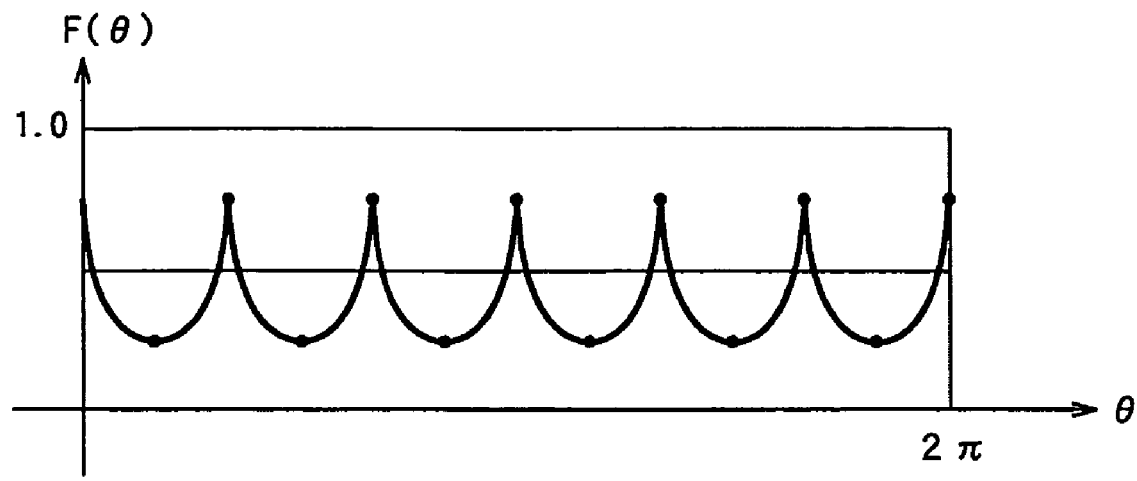
FIG. 6 shows trajectory of a function F(,,).

FIG. 6 shows the trajectory of the function F(,,).

Figure 7:
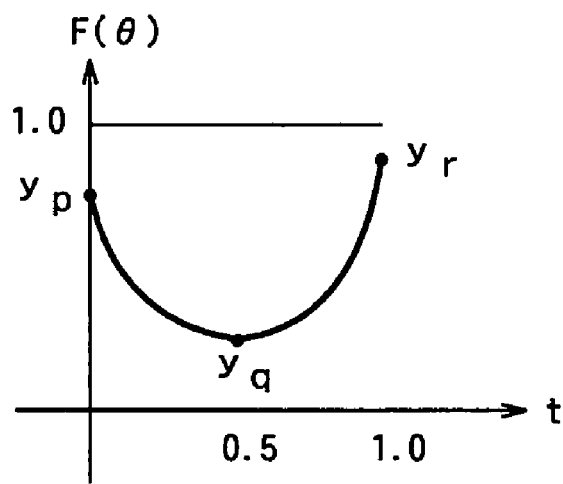
FIG. 7 illustrates an apex point used in the function F(,,).

In the equation (1-1), $y_p$, $y_r$ and $y_q$ denote the apex points and a bottom point of the jagged shape formed by the function F(,,). The apex points $y_p$, $y_r$ and the bottom point $y_q$, shown in FIG. 7, are found by random numbers, as shown by the equation (1-2):

$y_p, y_r$=(16.0+(fix AmpMax+fix Random×Rnd)×4.0)/16.0

$y_q$=(4.5+(fix AmpMin+fix Random×Rnd)×1.75)/16.0  (1-2)

0.5≤$y_p,y_r$≤2.0

1.0/16.0≤$y_q$≤0.5 where Rnd: random number of [0.0, 1.0]

so that the apex points $y_p$, $y_r$ and the bottom point $y_q$ may be placed at variable positions along the redirection on the polar coordinate system.

In this manner, the bullet mark effect may be carried out using the function F(,,) having different apex and bottom points each time.

If a sequential read address (x, y) is specified for the read address generator 3, the address (X, Y) of the picture data read out from the frame buffer 2 may be found on conversion by the following sequence of operations:

First, the coordinate system of the picture, stored in the frame buffer 2, is transformed to the rectangular coordinate system, centered about (cx, cy), using the equation (2-1):

x0=x−cx y0=y−cy  (2-1)

to convert the read address (x, y) to the address (x0, y0).

The rectangular coordinate system is then transformed into the polar coordinate system, using the equation (2-2):

$$r = \sqrt{x0^2 + y0^2} \quad (2\text{-}2)$$

$$\theta = \arctan\left(\frac{y0}{x0}\right).$$

Figure 8:
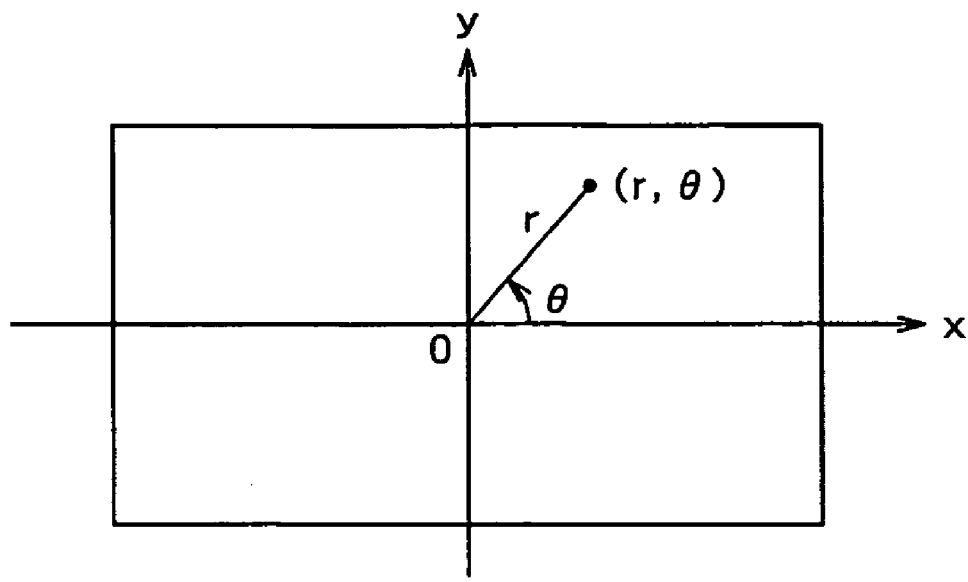
FIG. 8 shows the manner the address (x0, y0) has been converted to that on the polar coordinate system.

This transforms the address (x0, y0) into the address (r, ,,), as shown in FIG. 8.

Figure 9:
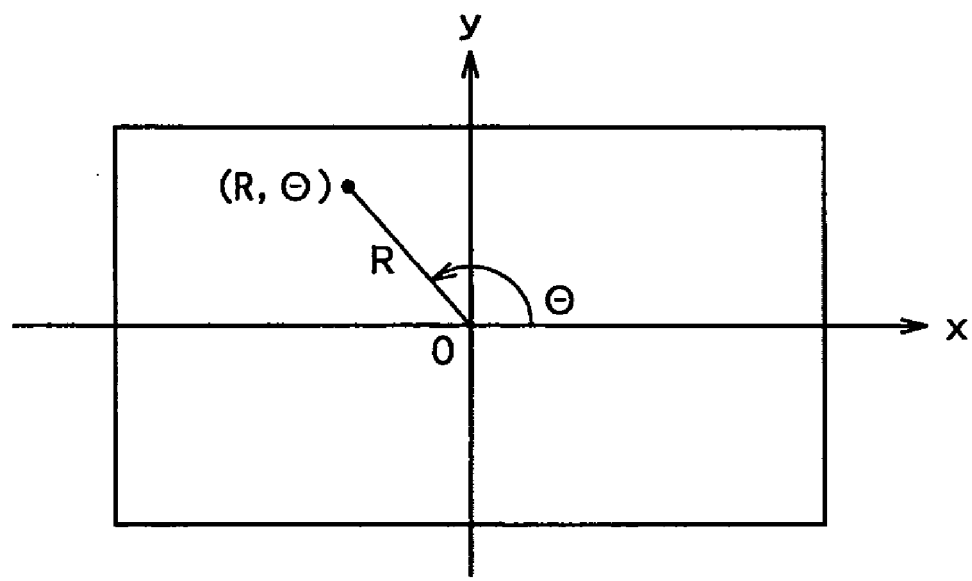
FIG. 9 shows the manner the address (r, ,,) has been converted to an address (R, ,,).

The address (r, ,,) is then converted into the address (R, ,,), as shown in FIG. 9, using the equations (2-3) and (2-4):

R=$f_1$((r−radius)×$f_2$(θ))

Θ=θ  (2-3)

R=$f_3$(r)

Θ=θ  (2-4).

It is noted that the equations (2-3), (2-4) denote the addresses of the Over Side picture and the Under Side picture, respectively.

Meanwhile, the functions $f_1$(r), $f_2$(,,) in the equation (2-3) are represented by the equations (2-5) and (2-6), respectively:

$$f_1(r) = \begin{cases} \text{radius} - r \times \text{fixScale} & (0 \le r < \text{radius}) \\ \max & (\text{radius} \le r) \end{cases} \quad (2\text{-}5)$$

$f_w(\theta)=F(\theta)$  (2-6)

while the function $f_3$(r) in the equation (2-4) is represented by the equation (2-7):

$$f_3(r) = \begin{cases} \max & (0 \le r < \text{radius}) \\ r & (\text{radius} \le r) \end{cases} \quad (2\text{-}7)$$

where radius=fixRadius×picture height.

The equation (2-6) is the function F(,,), indicated by (1-1). In the equations (2-5) and (2-7), max indicates designation of an address other than the picture that may be designated by the address (X, Y). For example, if max designates the address where there is stored a blue picture stored in the frame buffer 2, another picture way readily be synthesized to an area which has become the aforementioned Max, using the above picture as a key signal. In the bullet mark effect, the area within the radius is max.

The address (R, ,,) produced is then converted from the polar coordinate system to the address (X0, Y0) of the rectangular coordinate system, using the equation (2-8):

X0=R cos Θ

Y0=R sin Θ  (2-8).

Since the address (X0, Y0) is the address obtained on conversion about the point of origin as center, on the rectangular coordinate system, the address (X, Y), converted so as to have the center point (cx, cy) as the center, is found, using the equation (2-9):

$$X = X0 + cx$$

$$Y = Y0 + cy \quad (2\text{-}9).$$

In this manner, the read address generator 3 converts the read address (x, y) into the address (X, Y) of the picture data stored in the frame buffer 2.

The hardware structure of the read address generator 3 in carrying out the bullet mark effect is now explained with reference to FIG. 10.

The read address generator 3 includes plural modules, such as an adder-multiplier and a polar coordinate to rectangular coordinate converter, and executes the above calculations, based on the combination of these modules.

Figure 10:
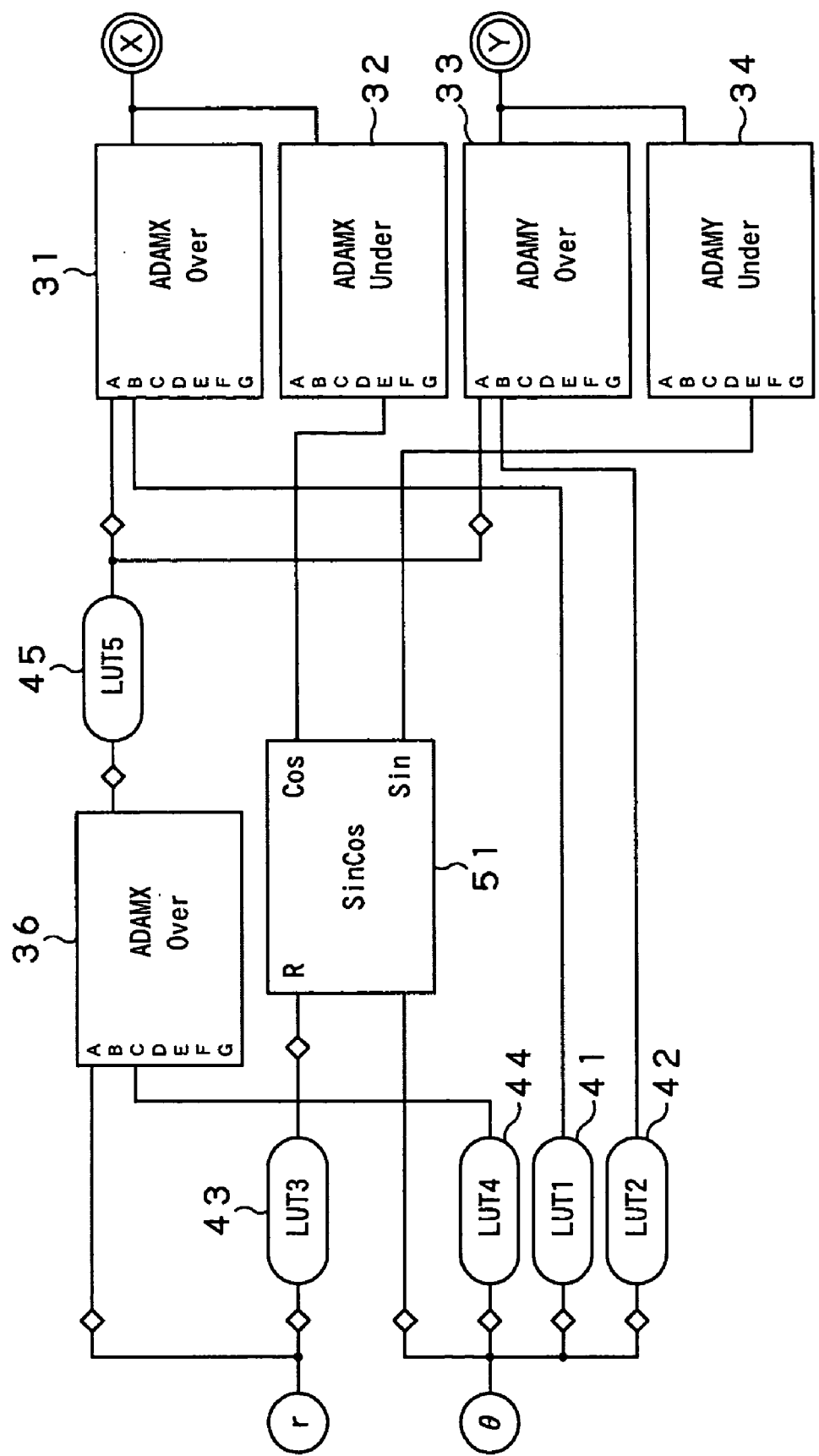
FIG. 10 illustrates the hardware structure of the read address generator.

In executing the bullet mark effect, LUTs (look-up tables) 41 to 45, an ADAMX (Over) 31, an ADAMX (Under) 32, an ADAMY (Over) 33, an ADAMY (Under) 34, an ADAMX (Ch2) 36 and a SinCos 51, of the read address generator 3, are used, as shown in FIG. 10.

The LUTs 41 to 45 are RAM (random access memory) tables, referred to by an address designated by cross-points indicated by diamond-shaped marks in the drawing. The data are set by a central processing unit (CPU), not shown. In the LUTs 41 to 45, cos,,, sin,,, fa(r) of the equation (2-7), $f_2(,,)$ of the equation (2-6) and $f_1(r)$ of the equation (2-5) are set, respectively, by the central processing unit (CPU), not shown.

The ADAMX (Over) 31, ADAMY (Under) 32, ADAMY (Over) 33, ADAMY (Under) 34 and the ADAM (Ch2) 36 are each provided with terminals A to G. and apply the calculations of (A+B)×(C+D)+E+F+G by addition and multiplication. For the terminals A to G, constant numbers or the cross-points indicated by diamond-shaped marks in the drawing may be designated.

The coordinate converter 51 is used for transforming the polar coordinate system to the rectangular coordinate system.

The operation of conversion from the read address (x, y) to the address (X, Y) by the above-described read address generator 3 is now explained. It is noted that the calculations shown in the equations (2-1) and (2-2) are carried out on the read address (x, y) as pre-processing by the matrix calculations, and that the address (r, ,,) as converted to the polar coordinate system is entered to the read address generator 3.

The ADAM (Ch2) 36 executes (r−radius)×$f_2(,,)$, based on the address r and an output of the LUT 44. This value is entered by the LUT 45 to the $f_1(r)$ by the LUT 45 where the equation (2-3) is carried out to calculate the address R of the Over Side. The address R, calculated in the LUT 45, is passed through the cross-point and sent to the ADAMX (Over) 31 and to the ADAMY (Over) 33.

The ADAMX (Over) 31 executes the equation (2-8), based on the address R and cos(,,), supplied from the LUT 41, to calculate the address X0. The address X0 is then summed to cx to execute the equation (2-9) to calculate the address X of the Over Side.

The ADAMY (Over) 33 executes the equation (2-8), based on the address R and sin(,,), supplied from the LUT 42, to calculate the address Y0. The address Y0 is then summed to cy to execute the equation (2-9) to calculate the address Y of the Over Side.

From R=$f_3(r)$ of the equation (2-4), output from the LUT 43, and,,=,,, from the equation (2-4), the coordinate converter 51 executes (2-8) by way of coordinate transformation to calculate the address (X0, Y0)=(Rcos,, , Rsin,,). Rcos,, and Rsin,, are sent to the ADAMX (Under) 32 and to the ADAMY (Under) 34, respectively.

The ADAMX (Under) 32 sums cx to Rcos,, to execute (2-9) to calculate the address X of the Under Side.

The ADAMY (Under) 34 sums cy to Rsin,, to execute (2-9) to calculate the address Y of the Under Side.

As for an area where the address (X, Y) of the Over Side and the address (X, Y) of the Under Side, as calculated, overlap with each other, the address (X, Y) of the Over Side is to be output.

In this manner, the special picture effect device 1 uses the hardware, forming the read address generator 3, by a suitable combination, for converting the read address (x, y), entered to the read address generator 3, into the address (X, Y) usable for reading out a picture corresponding to the picture stored in the frame buffer 2 and which has been processed with the flipping effect.

What is claimed is:

1. A special effect device in which picture signals are read out from a frame buffer based on an address signal to impart a desired special effect to a picture corresponding to the picture signals read out from said frame buffer, said special effect device comprising:

address signal generating means for generating a readout address signal for said picture signals stored in said frame buffer so that, by rupturing a picture portion within an area at an optional position of said picture, defined by a circle having a radius of an optional size, with the center of the circle as a rupturing point, a folded figure will be obtained which has the circumference of said circle as a topological boundary, wherein the shape of the folded figure is prescribed by a function F(θ), wherein the function F(θ) is represented by the equation (1-1):

$$F(\theta) = F'(t) = \begin{cases} 4(y_p - y_q)(t - 0.5)^2 + y_q & (0.0 \le t < 0.5) \\ 4(y_r - y_q)(t - 0.5)^2 + y_q & (0.5 \le t < 1.0) \end{cases} \quad (1\text{-}1)$$

where t=θ×1Plickle (mod2π);
which satisfies the equation (1-2):

$$y_p, y_r, = (16.0 + (\text{fix AmpMax} + \text{fix Random} + \text{Rnd}) + 4.0)/16.0$$

$$y_q = (4.5 + (\text{fixAmpMin} + \text{fix Random} + \text{Rnd}) + 1.75)/16.0 \quad (1\text{-}2)$$

$$0.5 \le y_r \le 2.0$$

$$1.0/16.0 \le y_q \le 0.5;$$

where Rnd is a random number between 0.0 and 1.0.

2. The special effect device according to claim 1 wherein, with the radius of an optional size, the contraction ratio fixscale of said picture signals folded and output to said radius of the optional size radius and the function F(θ) prescribing the shape of the folded figure, a readout address signal (R, Θ) on the polar coordinate system in an area for outputting a folded picture portion is generated by the equation (2-3):

$$R = f_1((r\text{-radius}) \times f_2(\theta)) \quad (2\text{-}3);$$

a readout address signal (R, Θ) on the polar coordinate system in an area for outputting a non-folded picture portion is generated by the equation (2-4):

$$R = f_r(r)\Theta = \theta \quad (2-4)$$

the readout address signal (R, Θ) on the polar coordinate system is converted the rectangular coordinate system to generate a readout address signal (X0, Y0) by the equation (2-8):

$$x0 = x - cx$$

$$y0 = y - cy \quad (2-8)$$

and wherein
a readout address signal (X, Y) in case the position of said rupture point in the rectangular coordinate system of said picture signals is (cx, cy) is generated by the equation (2-9)

$$r = \sqrt{x0^2 + y0^2} \quad (2-9)$$

$$\theta = \arctan\left(\frac{y0}{x0}\right)$$

the equation (2-3) satisfies the equations (2-5) and (2-6):

$$f_1(r) = \begin{cases} radius - r \times fixScale & (0 \leq r < radius) \\ max & (radius \leq r) \end{cases} \quad (2-5)$$

$$f_2(\theta) = f(\theta) \quad (2-6)$$

the equation (2-4) satisfies the equation (2-7):

$$f_3(r) = \begin{cases} max & (0 \leq r < radius) \\ r & (radius \leq r) \end{cases} \quad (2-7)$$

where radius = fixRadius×picture height; and wherein
in the equations (2-5) and (2-6), max indicates the generation of the readout address signal for reading out a signal other than the picture signals stored in said frame buffer.

3. An address signal generating device for generating an address signal for reading out picture signals corresponding to a picture from a frame buffer, comprising:
address signal generating means for generating a readout address signal for said picture signals stored in said frame buffer so that, by rupturing a picture portion within an area at an optional position of said picture, defined by a circle having a radius of an optional size, with the center of the circle as a rupturing point, a folded figure will be obtained which has the circumference of said circle as a topological boundary,
wherein the shape of the folded fixture is prescribed by function F(θ),
where the function F(θ) is represented by the equation (1-1):

$$F(\theta) = F'(t) = \begin{cases} 4(y_p - y_q)(t - 0.5)^2 + y_q & (0.0 \leq t < 0.5) \\ 4(y_r - y_q)(t - 0.5)^2 + y_q & (0.5 \leq t < 1.0) \end{cases} \quad (1-1)$$

where $$t = \theta \times 1Plickle \pmod{2\pi};$$

which satisfies the equation (1-2):

$$y_q, y_r = (16.0 + (\text{fix AmpMax} + \text{fix Random} \times \text{Rnd}) \times 4.0)/16.0$$

$$Y_q = (4.5 + (\text{fix AmpMin} + \text{fix Random} \times \text{Rnd}) \times 1.75)/16.0 \quad (1-2)$$

$$0.5 \leq y_p, y_r \leq 2.0$$

$$1.0/16.0 \leq y_q \leq 0.5$$

where Rnd is a random number between 0.0 and 1.0.

4. An address signal generating method far generating an address signal for reading out picture signals corresponding to a picture from a frame buffer, comprising:
an address signal generating step of generating a readout address signal for said picture signals stored in said frame buffer so that, by rupturing a picture portion of an area at an optional position of said picture defined by a circle having a radius of an optional size, with the center of the circle as a rupturing point, a figure picture will be obtained which has the circumference of said circle as a topological boundary,
wherein the shape of the folded figure is prescribed by function F(θ),
where the function F(θ) is represented by the equation (1-1):

$$F(\theta) = F'(t) = \begin{cases} 4(y_p - y_q)(t - 0.5)^2 + y_q & (0.0 \leq t < 0.5) \\ 4(y_r - y_q)(t - 0.5)^2 + y_q & (0.5 \leq t < 1.0) \end{cases} \quad (1-1)$$

where $$t = 74 \times 1Plickle \pmod{2\pi};$$

which satisfies the equation (1-2):

$$y_p, y_r = (16.0 + (\text{fix AmpMax} + \text{fix Random} \times \text{Rnd}) \times 4.0)/16.0$$

$$Y_q = (4.5 + (\text{fix AmpMin} + \text{fix Random} \times \text{Rnd}) \times 1.75)/16.0 \quad (1-2)$$

$$0.5 \leq y_p, y_r \leq 2.0$$

$$1.0/16.0 \leq y_q \leq 0.5$$

where Rnd is a random number between 0.0 and 1.0. step of displaying the folded figure.

5. A computer readable medium storing An address signal generating program for having a computer execute an address signal generating process for reading out picture signals corresponding to a picture from a frame buffer, comprising:
said address signal generating process including generating a readout address signal for said picture signals stored in said frame buffer so that, by rupturing a picture portion of an area at an optional position of said picture defined by a circle having a radius of an optional size, with the center of the circle as a rupturing point, a folded picture figure will be obtained which has the circumference of said circle as a topological boundary, the shape of the folded figure is prescribed by function F(θ), where the function $F(\theta)$ is represented by the equation (1-1):

$$F(\theta) = F'(t) = \begin{cases} 4(y_p - y_q)(t-0.5)^2 + y_q & (0.0 \leq t < 0.5) \\ 4(y_r - y_q)(t-0.5)^2 + y_q & (0.5 \leq t < 1.0) \end{cases} \quad (1-1)$$

where $t = \theta 1\text{Plickle} \pmod{2\pi}$;

which satisfies the equation (1-2);

$y_p, y_r = (16.0 + \text{fix AmpMax} + \text{fix Random} \times \text{Rnd}) \times 4.0)/16.0$ $Y_q = (4.5 + \text{fix AmpMin} + \text{fix Random} \times \text{Rnd}) \times 1.75)/16.0 \quad (1-2)$ $0.5 \leq y_p, y_r \leq 2.0$ $1.0/16.0 \leq y_q \leq 0.5$;

where Rnd is a random number between 0.0 and 1.0.

* * * * *